United States Patent [19]
Oglesbee et al.

[11] Patent Number: 6,091,229
[45] Date of Patent: Jul. 18, 2000

[54] SUB-MINIATURE HIGH EFFICIENCY BATTERY CHARGER SYSTEM AND METHOD

[75] Inventors: John Wendell Oglesbee, Watkinsville; Michael D. Geren, Suwanee, both of Ga.

[73] Assignee: Motorola, Inc., Schaumburg, Ill.

[21] Appl. No.: 09/282,705

[22] Filed: Mar. 30, 1999

[51] Int. Cl.$^7$ ....................................................... H02J 7/00
[52] U.S. Cl. ........................................... 320/137; 320/164
[58] Field of Search ................................... 320/137, 140, 320/152, 157, 160, 163, 164

[56] References Cited

U.S. PATENT DOCUMENTS

| | | | |
|---|---|---|---|
| 5,371,456 | 12/1994 | Brainard | 320/164 |
| 5,633,576 | 5/1997 | Rose et al. | 320/160 |
| 5,656,923 | 8/1997 | Schultz et al. | 323/207 |
| 5,659,240 | 8/1997 | King | 320/134 |
| 5,661,393 | 8/1997 | Sengupta | 320/146 |
| 5,838,138 | 11/1998 | Henty | 320/123 |
| 5,994,872 | 11/1999 | Hall | 320/157 |
| 6,014,013 | 1/2000 | Suppanz et al. | 320/122 |

*Primary Examiner*—Adolf Deneke Berhane
*Assistant Examiner*—Pia Tibbits
*Attorney, Agent, or Firm*—Felipe Farley; Philip Burrus

[57] ABSTRACT

A battery charger system (10) consisting of a power supply unit (20) and a battery charger unit (70). The power supply unit (20) features a current profile generator (26) that defines a current profile of the output current of the power supply unit (20). The battery charger system (10) provides a unique way of communicating charging current demand between the battery charger unit (70) and the power supply unit (20). The power supply unit (20) is capable of determining the charging current demand by detecting specific logical operating states of the battery charger unit (70), and comparing the current to a set threshold. The battery charger unit (70) communicates charging current demand to the power supply unit (20), and the power supply unit (20) responds by adjusting its output current to meet the required demand.

12 Claims, 6 Drawing Sheets

SUB-MINIATURE HIGH EFFICIENCY BATTERY CHARGER SYSTEM AND METHOD

RELATED APPLICATION

This application is related to commonly assigned U.S. application No. 09/282,726, filed on even date, and entitled "SUB-MINIATURE HIGH EFFICIENCY BATTERY CHARGER EXPLOITING LEAKAGE INDUCTANCE OF WALL TRANSFORMER POWER SUPPLY, AND METHOD THEREFOR," Attorney Docket No. EN 10772, the entirety of which is incorporated herein by reference.

FIELD OF THE INVENTION

The present invention is directed to battery chargers, and more specifically to a batter charger system that achieves high efficiency control of battery charging current and which can be used with a variety of transformer types.

BACKGROUND OF THE INVENTION

Battery chargers are used to charge batteries of electronic appliances, such as portable computers, cellular telephones, pagers, etc. When used in connection with very small portable electronic devices, such as cellular telephones and pagers, it is preferable that the battery charger device be as small and portable as possible.

Battery chargers are known that use an ON-OFF control whereby the power source is alternatively connected and disconnected in order to generate an average charging current for the battery. A disadvantage of this type of battery charging system is that it is generally restricted to a single average value of charging current determined by the external power supply.

A need exists in the marketplace for a battery charging system which is low cost and retains the multi-chemistry performance advantages of a conventional switch mode power conversion system, but can be implemented in a miniature form without the use of bulky energy storage components. Furthermore, it is desirable to provide a battery charging system that can be used with a variety of transformers and other power sources.

DETAILED DESCRIPTION OF A PREFERRED EMBODIMENT

Figure 1:
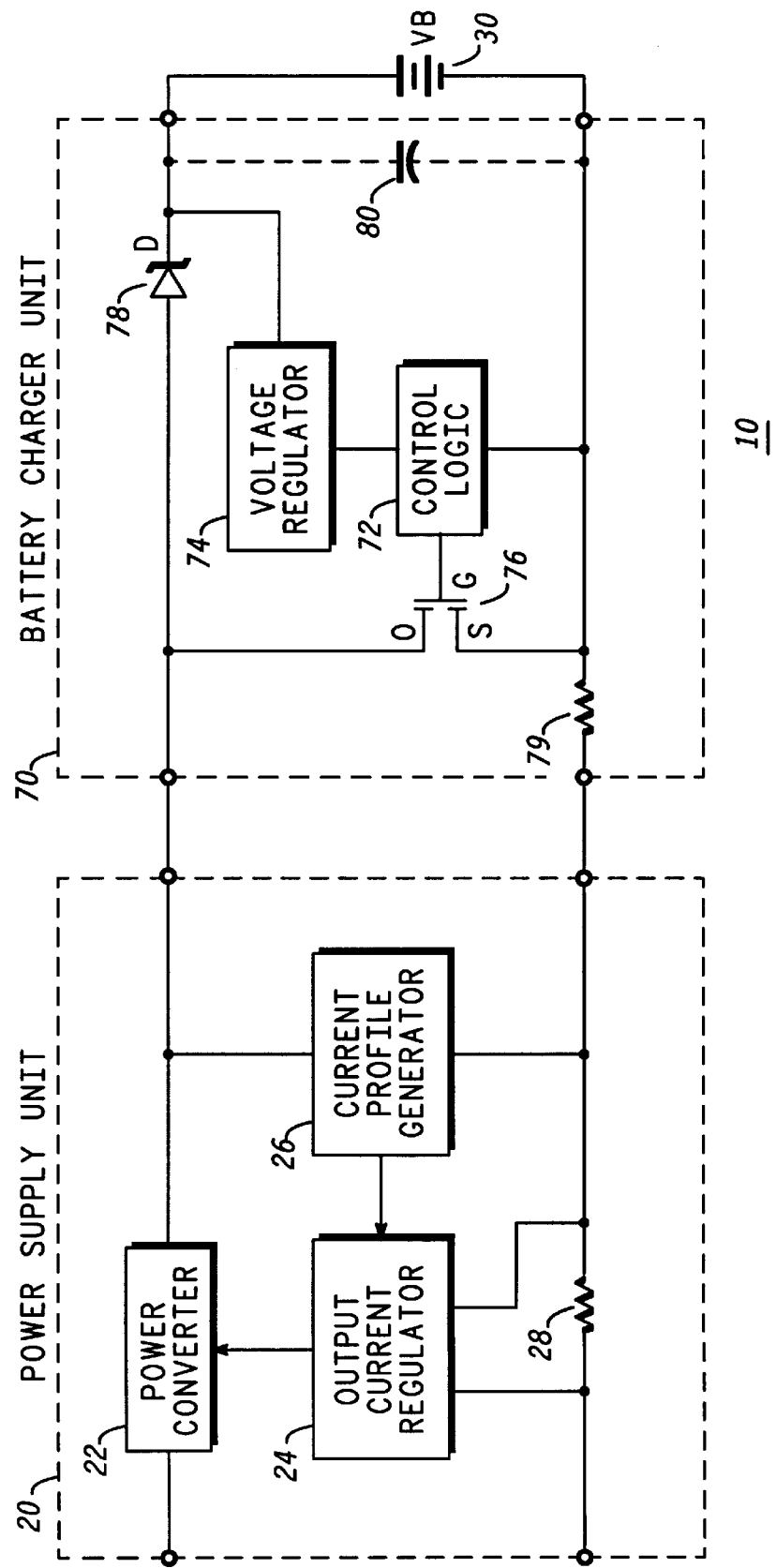
FIG. 1 is a block diagram of the battery charger system according to the present invention comprising a battery charger unit and a power supply unit.

Referring first to FIG. 1, the battery charger system is generally shown at reference numeral 10. The battery charger system 10 comprises two major components: a power supply unit 20 and a battery charger unit 70. The output current of the power supply unit 20 is controlled and variable and may be remotely controlled by the battery charger unit 70. All power conversion is done in the power supply unit 20 using high efficiency switch mode methods. This simplifies and reduces the circuits of the battery charger unit 70, and allows it to be significantly miniaturized compared to prior art battery charger units.

The power supply unit 20 comprises three basic functional blocks: a power converter 22, an output current regulator 24 and a current profile generator 26.

The power converter 22 of the power supply unit 20 may be one of a variety of prior art actively regulated power supplies, such as a universal input voltage flyback wall mounted power supplies and vehicular adapter (cigarette lighter) style power supplies. With respect to a universal input voltage flyback style power supply, these devices typically include active power conversion capability and may be designed to include output current control. A simple modification to the output current control regulator of such a power supply may be made for purposes of the present invention. Any specialized output current characteristics of the power supply must be understood to accommodate operation of the battery charger unit 70.

The power supply unit 20 is configured as a programmable current source and to emulate certain leakage characteristics of an inductor. Specifically, the power supply unit 20 is configured to maintain a specific value of output current (except for certain boundary limits) independent of all other operating conditions. The specific value of power supply output current is programmable, meaning that it can be changed at any time according to a predetermined set of requirements.

The power converter 22 and the output current regulator 24 function to maintain and regulate the output current of the power supply at a certain value, regardless of the output voltage and other variables. The basic operation of the power converter 22 and the output current regulator 24 are well known in the art, and is not described in detail herein.

The current profile generator 26 defines the unique specialized output current characteristics of the power supply unit 20. In addition, the current profile generator 26 is determines the specific value of output current that is to be maintained and regulated by the power supply unit 20. The current profile generator 26 has three modes of operation: Ramp Up Mode, Ramp Down Mode and Bootstrap Power Mode. The output current characteristics of the power supply unit 20 vary depending upon the operating mode of the current profile generator 26. Each mode of operation is determined and selected by the current profile generator 26 based on the value of the output voltage of the power supply unit 20. There is a defined output current profile characteristic for each operating mode.

The battery charger unit 70 comprises four major components: a control logic integrated circuit (IC) 72, a voltage regulator 74, a low cost N-channel power field effect transistor (FET) switch 76 and a low forward (Schottky) diode 78. A current sense resistor 79 is connected between one of the input terminals to the battery charger unit 70 and the source of the N-channel FET switch 76. There is also an optional "super" capacitor 80 that may be necessary for applications where it is desired to remove any ripple voltages in the battery charging current. The battery charger unit 70 connects to a battery 30. The battery charger unit 70 is similar to that disclosed in the aforementioned co-pending application. A more detailed explanation of the battery charger unit 70 can be found in that application, the entirety of which is incorporated herein by reference.

What is attractive about the battery charger unit 70 is that it can be manufactured on a single hybrid assembly only 12 mm square and 5 mm thick using "flip-chip" hybrid manufacturing technology. Alternatively, if the battery charger unit is implemented as an integrated host charger design, the battery charger unit 70 can be further reduced in size by sharing the capabilities of the microprocessor in the host device.

The battery charger unit 70 has been configured without any discrete bulk energy storage components, such as inductors or capacitors. In addition, no linear power conversion is required, which in prior art systems significantly dissipates power and limits charging capabilities. Further, the power supply internal to the control logic 72 has been simplified to eliminate any bulk energy capacitors.

The present invention involves a unique way of communicating charging current demand between the battery charger unit 70 and the power supply unit 20. The power supply unit 20 is capable of determining the charging current demand by detecting specific logical operating states of the battery charger unit 70. The battery charger unit 70 communicates charging current demand to the power supply unit 20, and the power supply unit 20 responds by adjusting its output current to meet the required demand.

Figure 2:
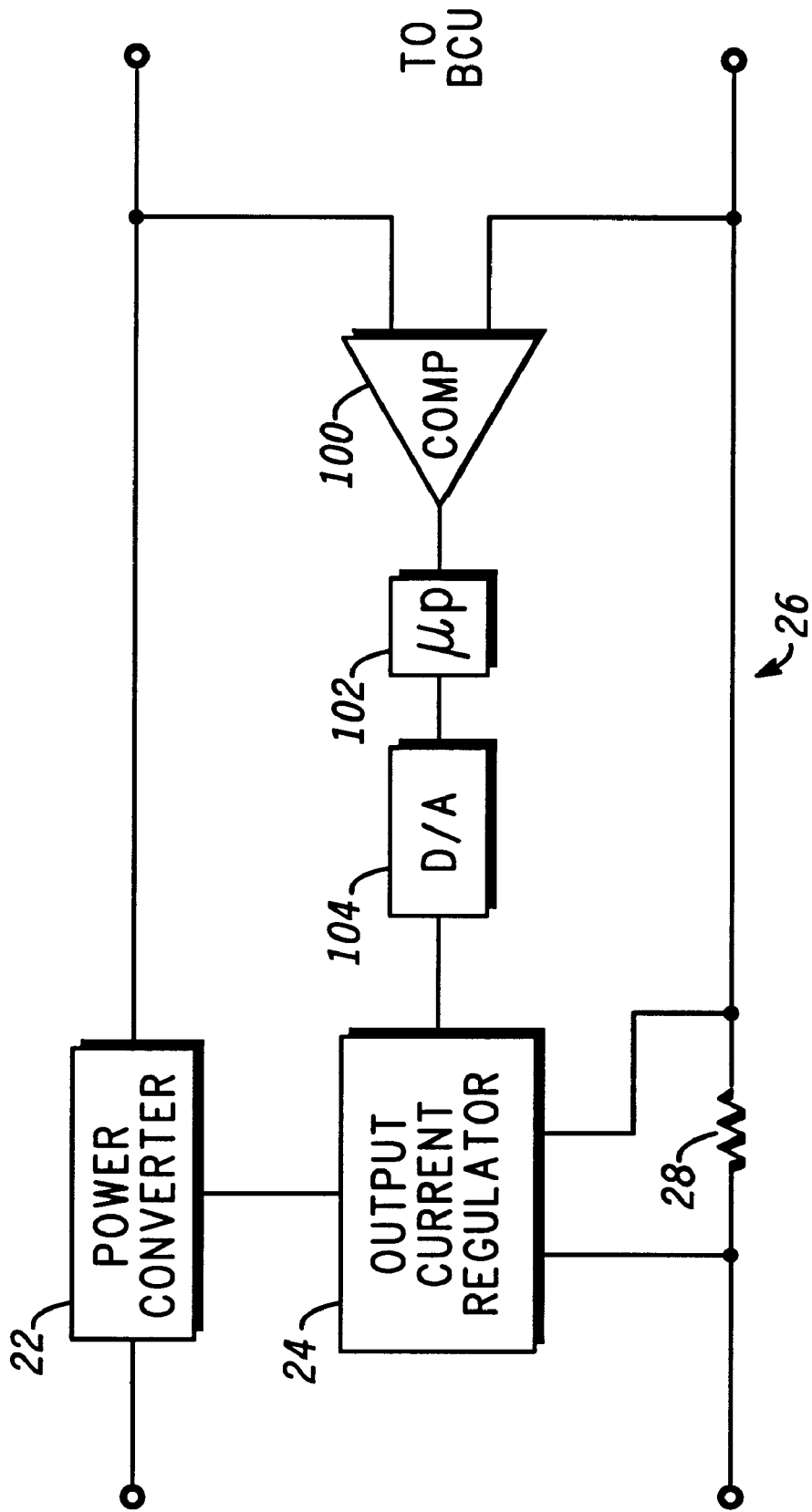
FIG. 2 is schematic diagram of the power supply unit portion of the battery charger system shown in FIG. 1.

Turning to FIG. 2, the current profile generator 26 comprises a comparator 100, a microprocessor 102, and a digital-to-analog (D/A) converter 104. The comparator 100 is connected across the terminals of the battery charger unit 70 and compares the voltage across the battery charger unit 70 with a predetermined threshold, such as 1 V. The voltage across these terminals represents whether the battery charger unit 70 is ON or OFF. The comparator 100 generates a logic high output when the threshold is exceeded. The microprocessor 102 generates a control signal that is converted to an analog signal by the D/A converter 104 and is coupled to the output current regulator 24.

OPERATION OF THE POWER SUPPLY UNIT

The operating modes of the current profile regulator 26 of the power supply unit 20 will now be described, with reference to FIGS. 3 and 4. The microprocessor 102 is programmed by a software program to generate an output signal, converted to a suitable analog signal by the D/A converter 104 to achieve these modes of operation.

RAMP UP MODE

If the power supply output voltage is below a (first) minimum threshold, the power supply output is essentially short-circuited. In step 210, the comparator 100 of the current profile generator 26 detects this condition based on the voltage across it, and operates in the Ramp Up Mode. As explained above, a typical detection threshold may be 1.0 V, and the Ramp Up Mode would be entered when it is determined that the power supply output voltage is less than 1.0 V.

In the Ramp Up Mode, the microprocessor 102 is programmed to generate an output current profile that increases the current supplied by the power converter 22 (from whatever its previous value was) until either a new mode is determined, or until some absolute maximum (safe) value of output current is reached. The increase of output current is approximately linear with time, and is relatively rapid. For example, in the Ramp Up Mode, the microprocessor 102 generates an output signal to cause the power converter 22 to generate a power supply output current which increases at a rate of 20 amps/second to an absolute maximum of 2.0 amps. This occurs at step 220 in FIG. 4. In this case, it would take 0.1 seconds for the power supply output current to increase from a previous value of zero to the 2.0 amp maximum.

RAMP DOWN MODE

The Ramp Down Mode is entered when the current profile generator 26 detects, in step 230, that the voltage supplied by the power converter 22 exceeds a (second) maximum threshold. For example, a typical battery voltage during "normal" charging is at least above 3.0 volts, and a typical Ramp Down Mode voltage threshold would be set at this value. The current profile generator 26 detects this condition to enter the Ramp Down Mode.

In the Ramp Down Mode, the microprocessor 102 generates an output signal that is converted to an analog signal by the D/A converter 104 to cause the power converter 22 to output a current that decreases (from whatever its previous value was) until either a new mode is determined, or until zero current is reached. The decrease of current is approximately linear with time, and is relatively slow. For example, in the Ramp Down Mode, the power supply output current may decrease at a rate of 0.5 amps/second. This occurs at step 240 in FIG. 4. It would take four seconds for the power supply output current to decrease from an absolute maximum value of 2.0 amps to zero.

During the Ramp Down Mode, current is supplied by the power supply to the battery charger unit 70 to charge the battery 30, as is explained further hereinafter.

BOOTSTRAP POWER MODE

If the power supply unit 20 is not in either the Ramp Up Mode or the Ramp Down Mode, then it by default is in the Bootstrap Power Mode. This condition is detected in step 210.

Following the examples given above, if the power supply output voltage is above 1.0 volts but less than 3.0 volts, the current profile generator 26 will detect this condition and operate in the Bootstrap Power Mode. In this mode, the power supply output current will be programmed to a constant current at some reduced rate well below the normal charging rate. For example, the output current may be programmed to a constant of 0.2 amps.

The Bootstrap Power Mode is provided because the battery charger unit control logic must be powered by the residual battery voltage under some operating conditions. If the residual charge on the battery 30 is not sufficient to operate the charger unit control logic, then the power supply unit 20 charges the battery 30 in the Bootstrap Power Mode until sufficient residual charge has been established to operate the battery charger unit 70.

The Bootstrap Power Mode is designed to charge completely discharged batteries which have insufficient residual charge. The bootstrap charge current is a safe charge level for all battery types. As increased residual charge is developed in the battery 30 during the Bootstrap Power Mode, the charging system changes over to a normal charging mode.

OPERATION OF THE BATTER CHARGER UNIT

The battery charger unit 70 has a sleep mode that is entered if no power supply is connected to the battery charger unit 70 (or if no input power is available). The control logic 72 enters a sleep mode if no power input voltage exists for a predetermined period of time. In the sleep mode, the control logic 72 operates at a reduced current and the switch 76 remains off. All operations of the battery charger unit 70 are minimized to reduce the load current. The sleep mode prevents the battery charger unit 70 from gradually discharging the battery when no power input is available. If a power supply unit 20 is connected to the battery charger unit 70 (and power is available to the power supply unit 20), the control logic 72 exits the sleep mode and the charging system 10 operates as described hereinafter.

NORMAL CHARGING MODE

Figure 3:
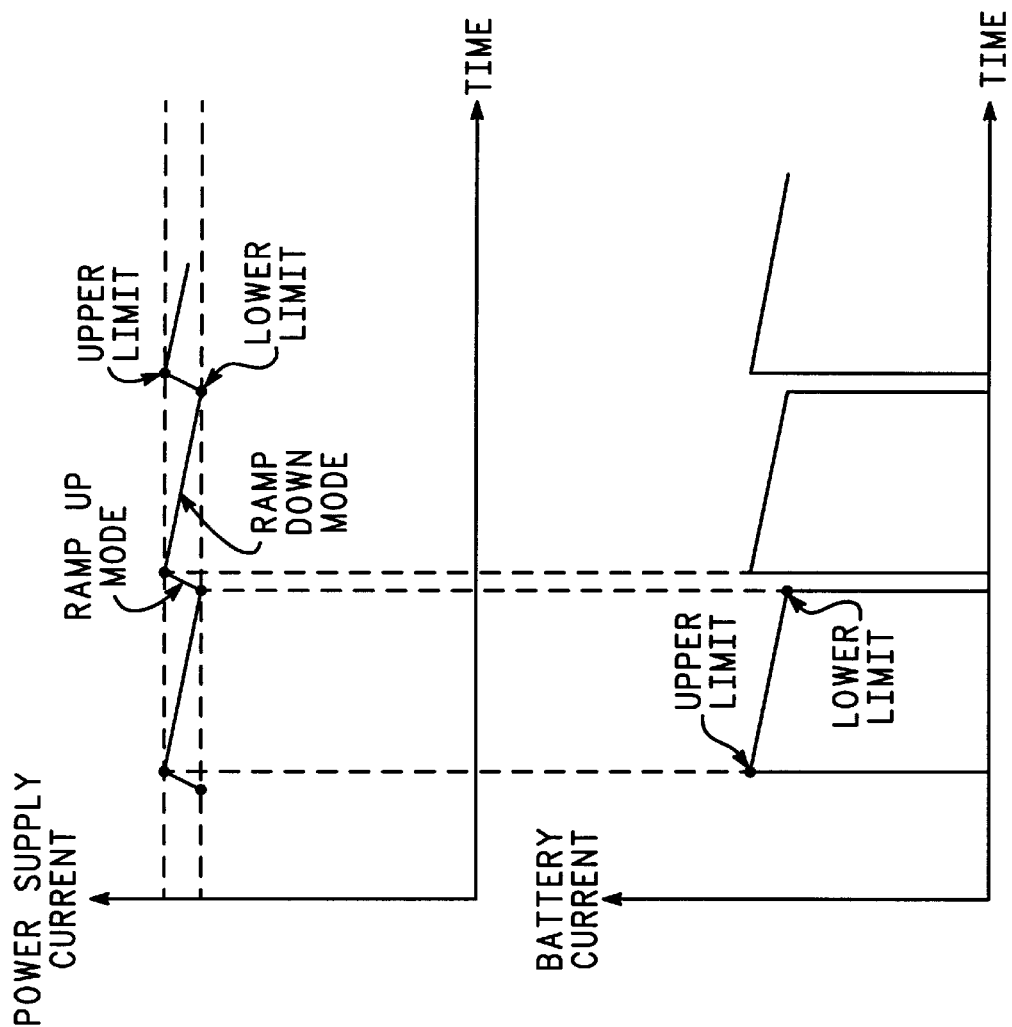
FIG. 3 is a graphical diagram showing output waveforms for the power supply unit and battery charger unit.
Figure 4:
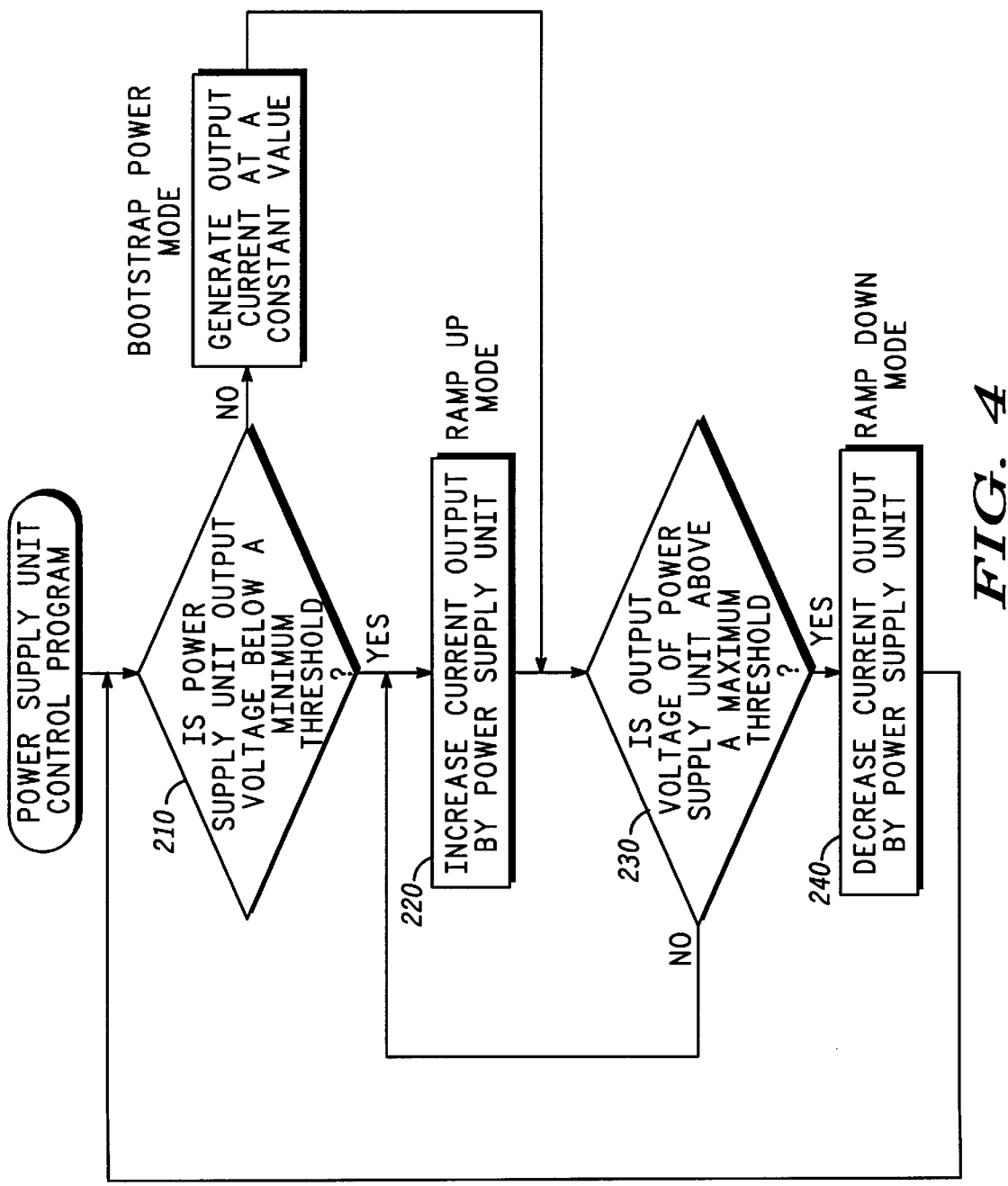
FIG. 4 is a flow diagram depicting the operation of the power supply unit.
Figure 5:
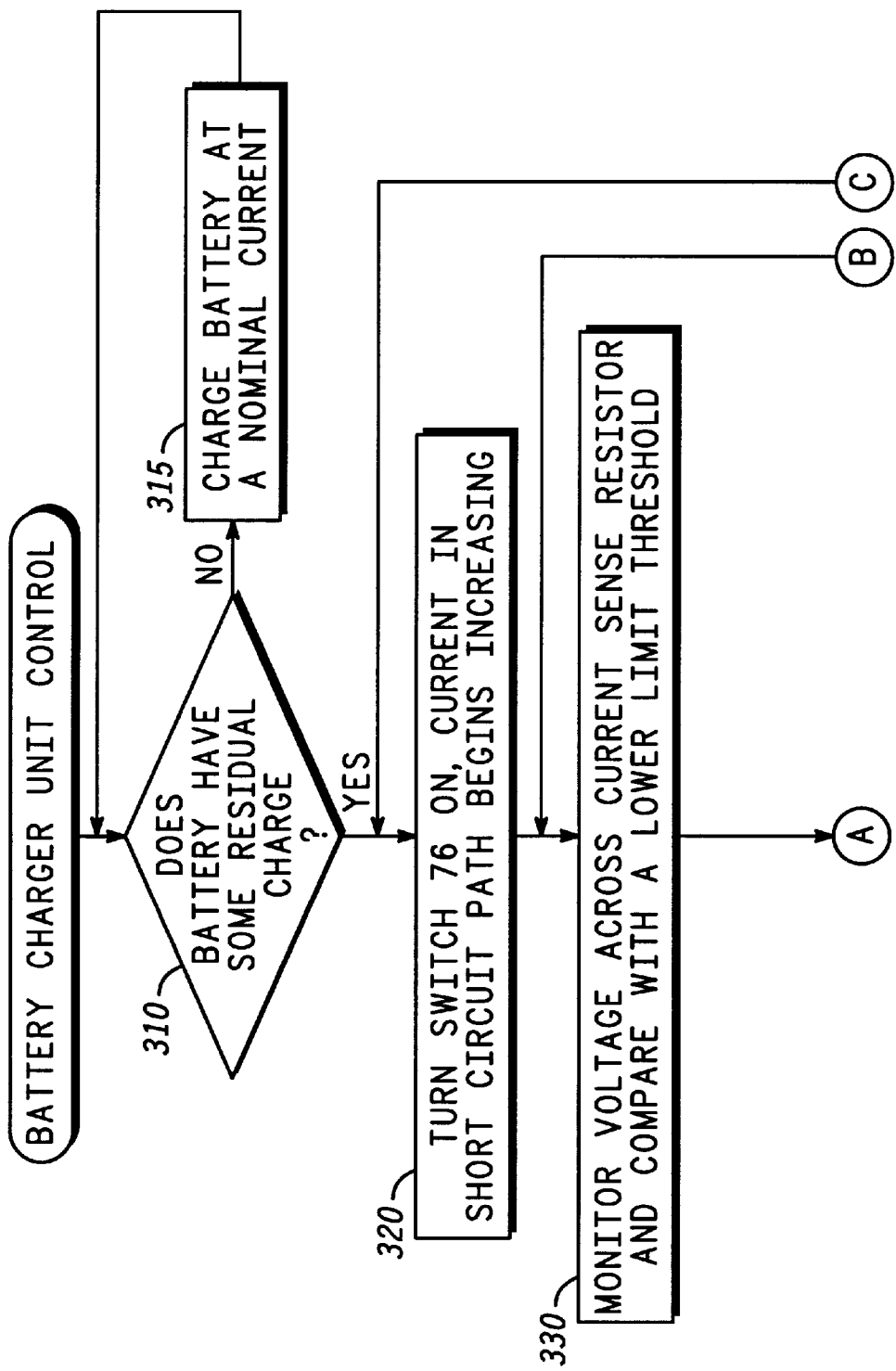
FIG. 5 is a flow diagram depicting the operation of the battery charger unit.
Figure 6:
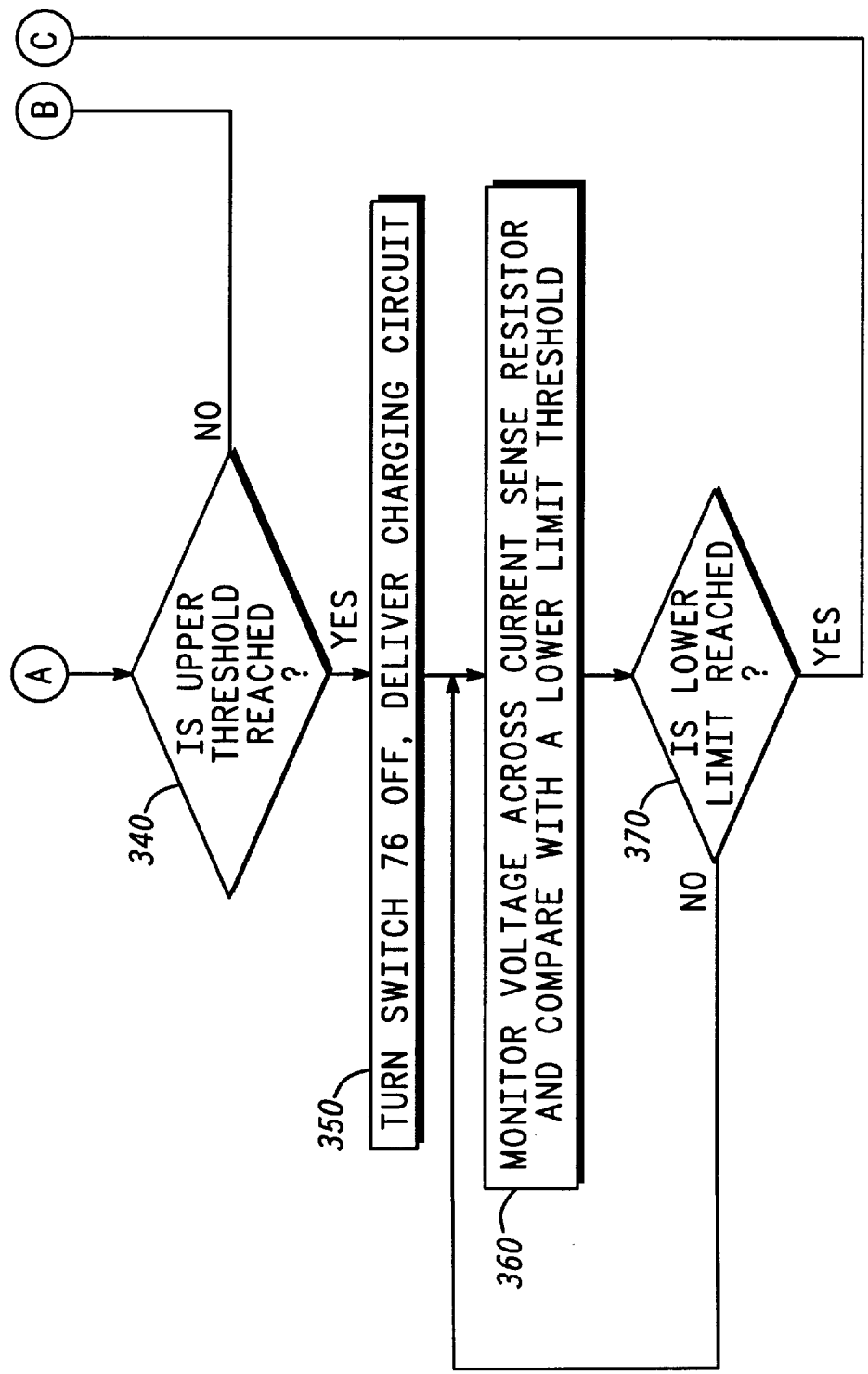
FIG. 6 is a flow diagram that is a continuation of FIG. 5 depicting the operation of the battery charger unit.

With reference to FIGS. 3–5, the normal charging mode of operation of the battery charger unit 70 is first described. In step 310, the control logic 72 determines whether the voltage across the battery 30 is of a sufficient residual charge to operate the voltage regulator 74 and thus power the control logic 72 of the battery charging unit 70. If there is sufficient charge, then the process continues.

Initially, in step 320, the control logic 72 turns (keeps) the switch 76 ON, causing short circuit of the input to the battery charger unit 70. The diode 78 prevents the battery current from flowing backwards through the short circuit created by the switch 76. The switch 76 also short circuits the output of the power supply unit 20, thereby keeping the output voltage of the power supply unit 20 below the threshold required to cause the power supply unit to enter the Ramp Up Mode. Consequently, the power supply unit 20 enters the Ramp Up Mode and current output by the power supply unit 20 begins increasing from its previous value, as explained above.

The control logic 72 of the battery charger unit 70 detects the increasing output current from the power supply unit 20 by way of the voltage drop developed across the current sense resistor 79. In step 330, the control logic 72 monitors this voltage and detects when it has reached a particular upper limit threshold value to open the switch 76. When the upper threshold is reached in step 340, the control logic 72 turns the switch 76 OFF, creating an open circuit in step 350. With the switch 76 open, the output current of the power supply unit 20 transfers from the short circuit path through the switch 76 to a new conduction path through the diode 78 and into the battery 30 to thereby charge the battery. The output voltage of the power supply unit 20 consequently increases to the battery voltage (plus a diode voltage drop) for this situation. As a result, the power supply unit output voltage eventually rises above the threshold required to enter the Ramp Down Mode, and therefore the power supply unit 20 enters the Ramp Down Mode.

In the Ramp Down Mode, the power supply output current begins decreasing. The control logic 72 of the battery charger unit 70 in step 360 detects the decreasing current by way of the voltage drop across the current sense resistor 79. In step 370, when the control logic 72 detects that the current has reached a lower threshold value, the control logic 72 again closes the switch 76 in step 320. This shorts the output power supply unit 20, and the power supply unit 20 returns to the Ramp Up Mode of operation. This process therefore repeats itself.

It is evident from the foregoing description that the output current of the power supply unit 20 is forced by the control logic 72 of the battery charger unit 70 to oscillate between the Ramp Up Mode and the Ramp Down Mode, as shown in FIG. 3. During the time that the switch 76 is OFF, current flows through the battery 30 and charges the battery. Except for the short time interval of each cycle when the switch is ON, the battery charging current is equal to the power supply unit output current. That is, the battery is charged during the Ramp Down Mode, and is not charged during the shorter periods of time corresponding to the Ramp Up Mode.

In the event that in step 310 it is determined that there is not sufficient residual charge on the battery, then in step 315, the power supply unit 20 defaults to the Bootstrap Power Mode, and the battery is charged at a reduced voltage and current until the battery develops sufficient residual charge to operate the control logic 72. It is anticipated that this state will last only a few minutes before the battery reaches an acceptable residual charge for normal charging operation.

The power supply unit output current and the battery charging current are controllable over a wide range because the control logic 72 of the battery charging unit 70 is able to continuously re-define the upper limit and lower limit values to maintain any desired average charging current. The control logic unit 72 can measure and calculate the actual average charging current across the sense resistor 79. The actual average current value can be used in a feedback relationship to maintain the correct upper and lower limit values in order to achieve any desired charging current.

The battery charging system of the present invention has significant advantages over prior art charging systems because the present invention does not require any power conversion elements in the battery charger unit. Nevertheless, the battery charger unit has the ability to vary the charging current over a wide range. Consequently, the battery charger system of the present invention is compatible with different battery chemistries and capacities that may require different charging current and voltage limits. The system is also compatible with future ultra-fast charging methods that require significantly higher charging current and charging power levels.

In summary, the present invention is directed to a battery charger system comprising a power supply unit and a battery charger unit. The a power supply unit comprises a power converter for converting power from a power source to generate an output current; an output current regulator for controlling the power converter; and a current profile generator coupled across the output terminals and controlling the output current regulator so as to cause the output current of the power converter to cycle between a first mode during which the output current increases and second mode during which the output current decreases. The battery charger unit comprising input terminals for receiving the output current of the power converter; output terminals for connection to a battery to be charged; a switch coupled between the input terminals; a current sense resistor connected between the transistor switch and an input terminal; and a controller connected to the switch and to the current sense resistor for sensing current therethrough and controlling a state of the switch, the controller responsive to output current from the power supply unit detected through the current sense resistor to close the switch when the output current from the power supply unit is increasing, and opening the switch and thereby coupling charging current to the battery when the output current from the power supply unit is decreasing.

Furthermore, the present invention is directed to a battery charging method comprising steps of converting power from a power source to generate a power supply output current that cycles between a first mode during which it increases and a second mode during which it decreases; connecting the power supply output current to a terminal of the switch; sensing current through the switch and maintaining the switch closed while the power supply output current increases until current through the switch exceeds an upper threshold; opening the switch when current through it exceeds the upper threshold, thereby diverting the power supply output current to the battery to charge the battery, and causing the power supply output current to begin decreasing; sensing current through the battery and maintaining the switch open until current through it reaches a lower threshold; and closing the switch when the current through the battery reaches the lower threshold, thereby causing the power supply output current to begin increasing.

Further still, the present invention is directed to a battery charger system comprising a power supply unit and battery charger unit. The power supply unit comprises a power converter for converting power from a power source to generate an output current; an output current regulator coupled to the power converter to regulator the output current generated by the power converter; and a current profile generator comprising a controller that monitors an output voltage of the power supply unit and defines a current profile of the output current of the power converter such that the output current cycles between a ramp up mode whereby the output current increases at a first rate, and a ramp down mode whereby the output current decreases at a second rate. The battery charger unit comprises input terminals for receiving the output current of the power supply unit; output terminals for connection to a battery to be charged; a switch connected between the input terminals; a current sense resistor connected between the transistor switch and an input terminal; and a controller connected to the switch and to the current sense resistor for sensing current therethrough and controlling the switch to maintain the switch closed during the ramp up mode of the output current from the power supply unit, open the switch when current through the current sense resistor reaches an upper threshold, maintain the switch open during the ramp down mode of the output current from the power supply unit to thereby divert the output current from the power supply unit to the battery, and close the switch when current through the current sense resistor reaches a lower threshold thereby short circuiting current through the switch and away from the battery.

The foregoing description is intended by way of example only and is not intended to limit the present invention in any way except as set forth in the following claims.

What is claimed is:

1. A battery charger system comprising:
  a power supply unit comprising:
    a power converter for converting power from a power source to generate an output current;
    an output current regulator for controlling the power converter;
    a current profile generator coupled across the output terminals and controlling the output current regulator so as to cause the output current of the power converter to cycle between a first mode during which the output current increases and second mode during which the output current decreases;
  a battery charger unit comprising:
    input terminals for receiving the output current of the power converter;
    output terminals for connection to a battery to be charged;
    a switch coupled between the input terminals;
    a current sense resistor connected between the transistor switch and an input terminal;
    a controller connected to the switch and to the current sense resistor for sensing current therethrough and controlling a state of the switch, the controller responsive to output current from the power supply unit detected through the current sense resistor to close the switch when the output current from the power supply unit is increasing, and opening the switch and thereby coupling charging current to the battery when the output current from the power supply unit is decreasing.

2. The system of claim 1, wherein the controller of the battery charger unit monitors the voltage across the current sense resistor and opens the switch when the voltage across the current sense resistor exceeds an upper threshold, and closes the switch when the voltage across the current sense resistor reaches a lower threshold.

3. The system of claim 2, wherein the current profile generator comprises:
  a comparator coupled to the output terminals of the power supply unit to compare the output voltage of the power supply unit with at least one threshold to generate an output signal, and
  a controller coupled to the comparator and responsive to the output signal of the comparator to generate a current control signal which is coupled to the output current generator, wherein the controller is responsive to detecting that the output voltage of the power supply unit is below a minimum threshold to generate a current control signal that causes the power converter to increase the output current at a first rate, and is responsive to detecting that the output voltage of the power supply unit is above a maximum threshold to generate a current control signal that causes the power converter to decrease the output current a second rate.

4. The system of claim 3, herein the controller of the current profile generator stores programmable values for the first rate and the second rate, wherein the first rate is substantially greater than the second rate.

5. The system of claim 1, wherein the battery charger unit further comprises a super capacitor coupled in parallel with the output terminals.

6. A battery charging method comprising steps of:
  converting power from a power source to generate a power supply output current that cycles between a first mode during which it increases and a second mode during which it decreases;
  connecting the power supply output current to a terminal of the switch;
  sensing current through the switch and maintaining the switch closed while the power supply output current increases until current through the switch exceeds an upper threshold;
  opening the switch when current through it exceeds the upper threshold, thereby diverting the power supply output current to the battery to charge the battery, and causing the power supply output current to begin decreasing;
  sensing current through the battery and maintaining the switch open until current through it reaches a lower threshold; and
  closing the switch when the current through the battery reaches the lower threshold, thereby causing the power supply output current to begin increasing.

7. The method of claim 6, wherein the step of generating the power supply output current comprises causing the power supply output current to increase at a first rate and to decrease at a second rate, wherein the first rate is substantially greater than the second rate.

8. A battery charger system comprising:
  a power supply unit comprising:
    a power converter for converting power from a power source to generate an output current;

an output current regulator coupled to the power converter to regulator the output current generated by the power converter;

a current profile generator comprising a controller that monitors an output voltage of the power supply unit and defines a current profile of the output current of the power converter such that the output current cycles between a ramp up mode whereby the output current increases at a first rate, and a ramp down mode whereby the output current decreases at a second rate;

a battery charger unit comprising:

input terminals for receiving the output current of the power supply unit;

output terminals for connection to a battery to be charged;

a switch connected between the input terminals;

a current sense resistor connected between the transistor switch and an input terminal;

a controller connected to the switch and to the current sense resistor for sensing current therethrough and controlling the switch to maintain the switch closed during the ramp up mode of the output current from the power supply unit, open the switch when current through the current sense resistor reaches an upper threshold, maintain the switch open during the ramp down mode of the output current from the power supply unit to thereby divert the output current from the power supply unit to the battery, and close the switch when current through the current sense resistor reaches a lower threshold thereby short circuiting current through the switch and away from the battery.

9. The system of claim 8, wherein the controller of the current profile generator is responsive to the output voltage of the power supply unit so as to switch from the ramp up mode to the ramp down mode when the output voltage of the power supply unit is greater than a maximum threshold, and to switch from the ramp down mode to the ramp up mode when the output voltage of the power supply unit is less than a minimum threshold.

10. The system of claim 8, wherein the controller of the current profile generator stores programmable values for the first rate and the second rate, wherein the first rate is substantially greater than the second rate.

11. The system of claim 8, wherein the battery charger unit further comprises a low forward voltage diode connected in series between an input terminal and an output terminal of the battery charger unit.

12. The system of claim 8, wherein the battery charger unit further comprises a super capacitor coupled in parallel with the output terminals.

* * * * *